United States Patent
Milvich

(10) Patent No.: US 6,646,433 B2
(45) Date of Patent: Nov. 11, 2003

(54) INDUCED CURRENT POSITION TRANSDUCERS USING TAPE SCALES WITH APERTURES

(75) Inventor: Michelle M. Milvich, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 11 days.

(21) Appl. No.: 10/082,252

(22) Filed: Feb. 26, 2002

(65) Prior Publication Data

US 2003/0160608 A1 Aug. 28, 2003

(51) Int. Cl.[7] ................................................. G01B 7/14
(52) U.S. Cl. .............................. 324/207.17; 324/207.12
(58) Field of Search ...................... 324/207.17, 207.24, 324/207.22, 207.26, 207.16, 207.19, 207.12; 336/45, 129, 225, 232, 200; 33/706, 708, 783

(56) References Cited

U.S. PATENT DOCUMENTS

| | | | |
|---|---|---|---|
| 4,853,684 A | 8/1989 | Hoppstadter | |
| 5,804,963 A | 9/1998 | Meyer | |
| 5,973,494 A | 10/1999 | Masreliez et al. | |
| 6,005,387 A | 12/1999 | Andermo et al. | |
| 6,011,389 A | 1/2000 | Masreliez et al. | |
| 6,049,204 A | * 4/2000 | Andermo et al. | 324/207.22 |
| 6,259,249 B1 | 7/2001 | Miyata | |
| 6,329,813 B1 | * 12/2001 | Andermo | 324/207.17 |
| RE37,490 E | 1/2002 | Andermo et al. | |

OTHER PUBLICATIONS

U.S. patent application Ser. No. 09/421,497, Andermo, filed Oct. 1999.

U.S. patent application Ser. No. 09/987,400, Milvich, filed Nov. 2001.

* cited by examiner

Primary Examiner—N. Le
Assistant Examiner—Subhash Zaveri
(74) Attorney, Agent, or Firm—Oliff & Berridge, PLC

(57) ABSTRACT

A reduced-offset induced current position transducer uses a tape scale to inductively couple at least one transmitter winding on a read head to one or more receiver windings on the read head. The at least one transmitter winding generates a primary magnetic field coupled to the tape scale. Apertures in the tape scale determine a pattern of induced current flow in the tape scale, including induced current flow in a region away from the primary magnetic field. At least one receiver winding is inductively coupled to the tape scale in a region away from the primary magnetic field. At least one of the transmitter winding or the receiver windings is formed in a periodic pattern complementary to the configuration of the apertures on the tape scale. Depending on the relative position between the read head and the scale, the receiver windings inductively couple to the tape scale to various degrees. A compact, high accuracy, high resolution inductive position sensor using an economical tape scale results. Low power operation is possible.

25 Claims, 11 Drawing Sheets

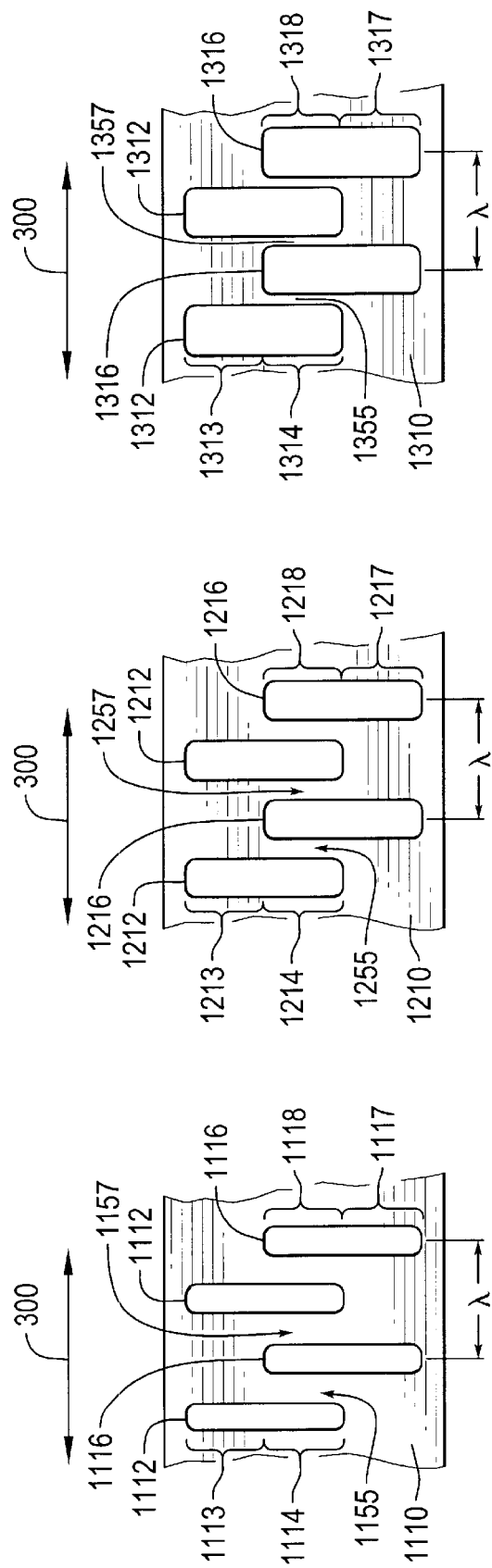

INDUCED CURRENT POSITION TRANSDUCERS USING TAPE SCALES WITH APERTURES

BACKGROUND OF THE INVENTION

1. Field of Invention

This invention relates to induced current linear and rotary position transducers.

2. Description of Related Art

Various induced current position transducers are known. U.S. Pat. No. 5,973,494, incorporated herein by reference in its entirety, discloses an electronic caliper using an induced current position transducer. U.S. Pat. No. 6,005,387, incorporated herein by reference in its entirety, discloses various reduced-offset high accuracy induced current position transducers and associated signal processing techniques. U.S. Pat. No. 6,329,813 and U.S. patent application Ser. No. 09/421,497, each incorporated herein by reference in its entirety, disclose various reduced-offset high accuracy induced current absolute position transducers and associated signal processing techniques. U.S. Pat. Nos. RE037490 and 6,049,204, each incorporated herein by reference in its entirety, disclose reduced-offset high accuracy induced current calipers and reduced-offset induced current linear scales respectively, as well as associated signal processing techniques.

A reduced-offset-type induced current position transducer generally includes a transmitter winding, a corresponding receiver winding and a signal generating and processing circuit on a readhead. Reduced-offset-type induced current position transducers are configured so that the transmitter winding and the corresponding receiver winding occupy separate regions on the readhead. The transmitter winding and the corresponding receiver winding are spaced apart in a direction transverse to the measuring axis of the position transducer. The transducer also includes a scale having at least one scale loop. The transmitter winding is inductively coupled to a first portion of the scale loop and a second portion of the scale loop is, in turn, inductively coupled to the corresponding receiver winding.

When a time-varying signal originating from the signal generating and processing circuit passes through the transmitter winding, a primary magnetic field is generated. The transmitter winding is inductively coupled to the first portions of the scale loops by the primary magnetic field. The second portions of the scale loops generate secondary magnetic fields. The receiver winding is inductively coupled to the second portions of the scale loops by the secondary magnetic fields.

At least one of the transmitter winding or the receiver winding is formed in a periodic pattern, such as a sinusoidal pattern, having dimensions corresponding to the coupling loops. Various winding configurations are known in the art to reduce or cancel the extraneous inductive coupling in the device. The receiver windings inductively couple with the second loop portions of the scale loops to differing degrees, depending on the position of the scale relative to the readhead.

U.S. Pat. No. 6,011,389, incorporated herein by reference in its entirety, discloses an incremental induced current position transducer. U.S. Pat. Nos. 5,804,963, 4,853,684 and 6,259,249, each incorporated herein by reference in its entirety, disclose various other types of induced current position transducers. The incorporated '389, '963, '684 and '249 patents include scale configurations wherein periodically arranged scale elements, in some embodiments, comprise conductive loops.

U.S. patent application Ser. No. 09/987,400, also incorporated herein by reference in its entirety discloses induced current position transducers having improved scale loop structures.

SUMMARY OF THE INVENTION

While each of the above-described references provides commercially viable induced current position transducers, there is always need for devices that can accomplish the functions of known devices at less expense. To this end, this invention provides reduced-offset-type induced current position transducers that perform with necessary signal gain and acceptable levels of position error, but that can be fabricated and assembled at a reduced cost.

The purpose of a scale in an induced current position transducer is to carry a pattern of induced currents that give rise to a periodically varying magnetic field. The magnetic field and/or the induced currents can be sensed by the receiver windings. This is accomplished by inducing a current with a transmitter winding held close to the scale, and manipulating conditions so that the current will flow as desired in the scale region where the periodic magnetic field is desired in order to determine the scale position. Scales used in known reduced-offset-type induced current position transducers are typically configurations of electrically isolated conductive loops. Such electrically isolated conductive loops can be manufactured by printing a conductive trace on a circuit board. A current is induced in the part of the loop that is close to the transmitter, and the induced current flows around the loop to determine the field measured by the receivers.

The reduced-offset-type induced current position transducers according to this invention can include conductive tape scales. The tape scales serve the same purpose as known scales, in the sense that they carry a pattern of induced currents that give rise to a periodically varying magnetic field, but they do so without the use of electrically isolated loops in which current is confined. The tape scales according to this invention accomplish this task through the use of apertures in the tape scale itself. When current is induced in a tape scale, the current flows along the surface of the tape scale. The induced current is present throughout the conductive sheet forming the tape scale, but is concentrated where the conductive sheet is closest to a transmitter winding. When apertures are added to the tape scale, as in the tape scales according to this invention, the induced current must flow around the apertures. Thus, the position of the apertures determines the pattern of the current induced by the transmitter. By carefully configuring the placement and size of apertures in the tape scale, the location and the direction of the current can be predicted and controlled, and accurate measurements can be obtained when the tape scale is employed in a reduced-offset-type induced current position transducer.

In various exemplary embodiments, the reduced-offset-type induced current position transducer according to this invention includes a first member and a second member having a measuring axis. The first member is movable along the measuring axis. At least one magnetic field generator is positioned on one of the first and second members. Each magnetic field generator generates a first changing magnetic flux in a respective first region in response to a drive signal.

In various exemplary embodiments, the other of the first and second members comprises a plurality of apertures formed in a conductive strip so that a first portion of each aperture is positionable within a respective first region and a second portion of each aperture is positionable in a respective second region distinct from the respective first region. An induced current is generated in the conductive strip in response to the first changing magnetic flux, the induced current including induced current flow in the respective second region. The apertures determine the pattern of induced current flow and the associated periodically varying magnetic field in the respective second region.

In various exemplary embodiments, at least one magnetic flux sensor is positioned on one of the first and second members. At least one of the at least one magnetic flux sensor and the at least one magnetic field generator includes a conductive trace or wire that extends along the measuring axis, the placement of the wire-like conductor transverse to the measuring axis being spatially modulated along the measuring axis so that the direction of the conductor is alternatingly in a first direction transverse to the measuring axis and a second direction, which is opposite to the first direction, transverse to the measuring axis. Each magnetic flux sensor is positioned outside a respective first flux region in a respective second region and is sensitive to at least one of the pattern of induced current flow and the associated periodically varying magnetic field in the respective second region. The inductive coupling between the alternating structure of the magnetic flux sensor and the pattern of induced currents and the associated periodically varying magnetic field in the respective second region varies as the magnetic flux sensor moves relative to the conductive strip and apertures along the measuring axis. Each magnetic flux sensor generates an output signal which is a function of the relative position between the magnetic flux sensor and at least some of the apertures.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIGS. 5–7 are plan views of three exemplary embodiments of tape scales according to this invention having rectangular apertures;

DETAILED DESCRIPTION OF EXEMPLARY EMBODIMENTS

In reduced-offset-type induced current position transducers, a scale is used to carry an induced current in a pattern that creates a periodic magnetic field. The pattern of the induced current and/or an associated periodic magnetic field can be sensed by the receiver windings. This is accomplished by employing a transmitter winding, which, when held close to the scale, induces a current in regions of the scale where the current flow and/or the associated periodic magnetic field are sensed. Scales in conventional reduced-offset-type induced current position transducers are typically designed as arrays of electrically isolated conductive loops. A time-varying current is induced in the part of the loop which is close to the transmitter and, based on the loop configuration, the induced current flows to a region away from the transmitter winding to produce a changing field sensed by the receivers. The tape scales employed in the induced current position transducers according to this invention achieve the same basic objective without using electrically isolated loops to confine the current.

While the current in the tape scale of this invention is not confined to a particular scale trace, the locations and directions of the current, that is, the locations and directions of the high current densities, can be controlled due to some known characteristics. First, a changing magnetic field induces a current that opposes the change. Second, the flow of current into and out of an area of a conductor must balance. Third, at high frequencies, current tends to flow along the surface or edge of a conductor.

Figure 1:
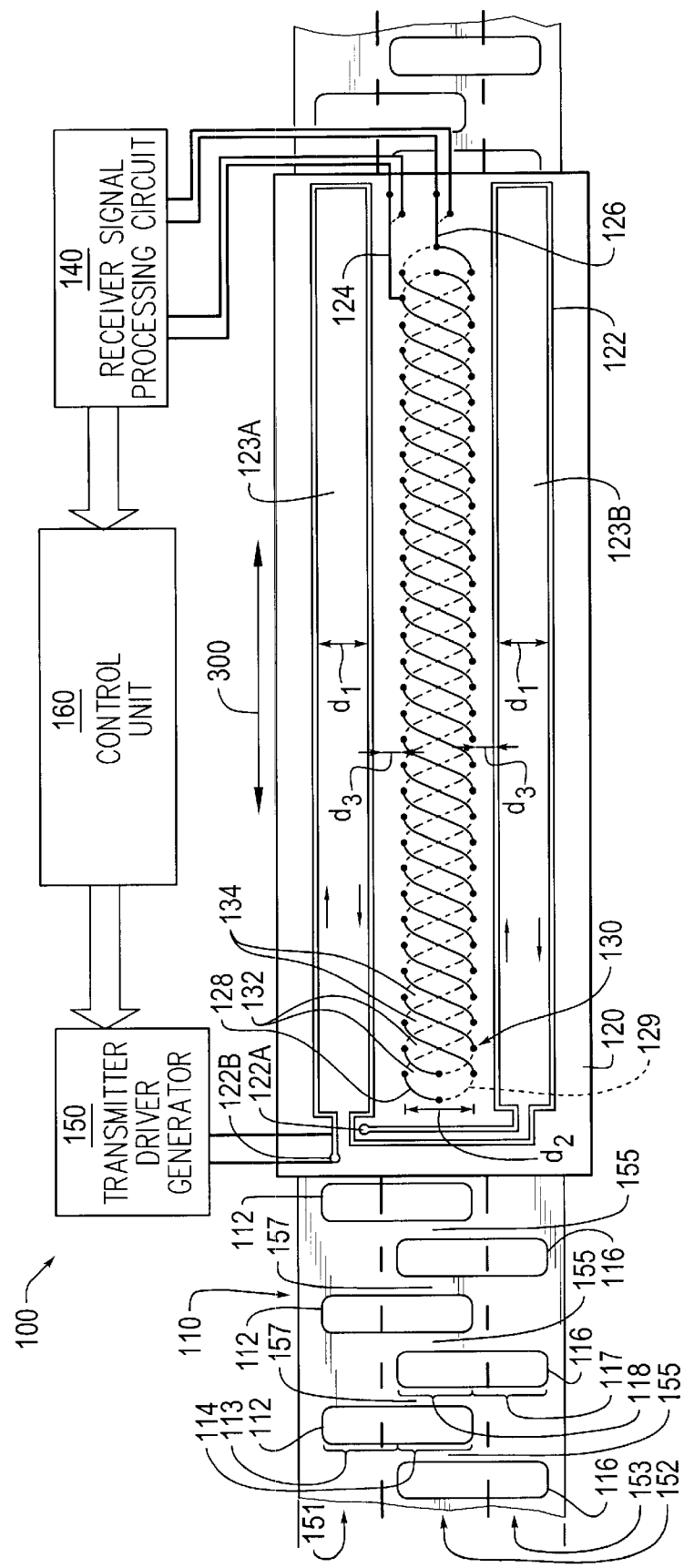
FIG. 1 is an illustration of an exemplary embodiment of a reduced offset induced current position transducer according to this invention including a plan view of an exemplary embodiment of a tape scale.

FIG. 1 illustrates an exemplary embodiment of a reduced-offset-type induced current position transducer 100 that includes an exemplary tape scale 110 having apertures 112 and 116. As shown in FIG. 1, a readhead 120 of the transducer 100 includes a transmitter winding 122 having a first transmitter winding portion 123A and a second transmitter winding portion 123B. The first transmitter winding portion 123A is provided at a first lateral edge of the readhead 120, while the second transmitter winding portion 123B is provided at the other lateral edge of the readhead 120. Each of the first and second transmitter winding portions 123A and 123B have the same long dimension extending along the measuring axis 300. Furthermore, each of the first and second transmitter winding portions 123A and 123B have a short dimension that extends a distance $d_1$ in a direction perpendicular to the measuring axis 300.

The terminals 122A and 122B of the transmitter winding 122 are connected to the transmitter drive signal generator 150. The transmitter drive signal generator 150 outputs a time-varying drive signal to the transmitter winding terminal 122A. Thus, a time-varying current flows through the transmitter winding 122 from the transmitter winding terminal 122A to the transmitter terminal 122B, as indicated in FIG. 1.

As the time-varying current flows, the first transmitter winding portion 123A generates a primary magnetic field that rises up out of the plane of FIG. 1 inside the first transmitter winding portion 123A and descends into the plane of FIG. 1 outside the loop formed by the first transmitter winding portion 123A. In contrast, the second transmitter winding portion 123B generates a primary magnetic field that rises out of the plane of FIG. 1 outside the loop formed by the second transmitter winding portion 123B and descends into the plane of FIG. 1 inside the loop formed by the second transmitter winding portion 123B. In response to the time varying current and the associated primary magnetic fields, a time varying induced current flow is induced in the tape scale 110 and produces an associated changing magnetic field. The pattern of the current flow is determined by the first and second plurality of apertures 112 and 116, the current flowing so as to counteract the changing primary magnetic fields. The time varying induced current and the associated changing magnetic field are sensed by first and second receiver windings 124 and 126, described further below.

The exemplary tape scale 110 of FIG. 1 includes a first plurality of apertures 112 interleaved with a second plurality of apertures 116.

Each of the first plurality of apertures 112 includes a first portion 113 and a second portion 114. Similarly, each of the second plurality of apertures 116 includes a first portion 117 and a second portion 118.

In the first plurality of apertures 112, the first portions 113 are arranged along one lateral edge of the scale 110 and are arrayed along a measuring axis 300. The second portions 114 are arranged along the center of the scale 110 and are also arrayed along the measuring axis 300.

Similarly, in the second plurality of apertures 116, the first portions 117 are arranged along a second lateral edge of the scale 110 and arrayed along the measuring axis 300. The second portions 118 are arranged along the center of the scale 110 along the measuring axis, interleaved with the second portions 114 of the first plurality of apertures 112.

The tape scale 110, the readhead 120, the first plurality of apertures 112 and the second plurality of apertures 116 can be described in terms of discrete functional regions or tracks aligned parallel to the measuring axis 300. Aligned with the first portions 113 of the first plurality of apertures 112 and the first transmitter winding portion 123A is a first respective region 151. Aligned with the first portions 117 of the second plurality of apertures 116 and the second transmitter winding portion 123B is a second respective region 153. Aligned with the second portions 114 of the first plurality of apertures 112, the second portions 118 of the second plurality of apertures 116, and the first and second receiver windings 124 and 126 is a respective central region 152. The central region 152 includes central tape scale portions 155 and 157 between the second portions 114 and 118 of the first plurality of apertures 112 and the second plurality of apertures 116, respectively.

Figure 4:
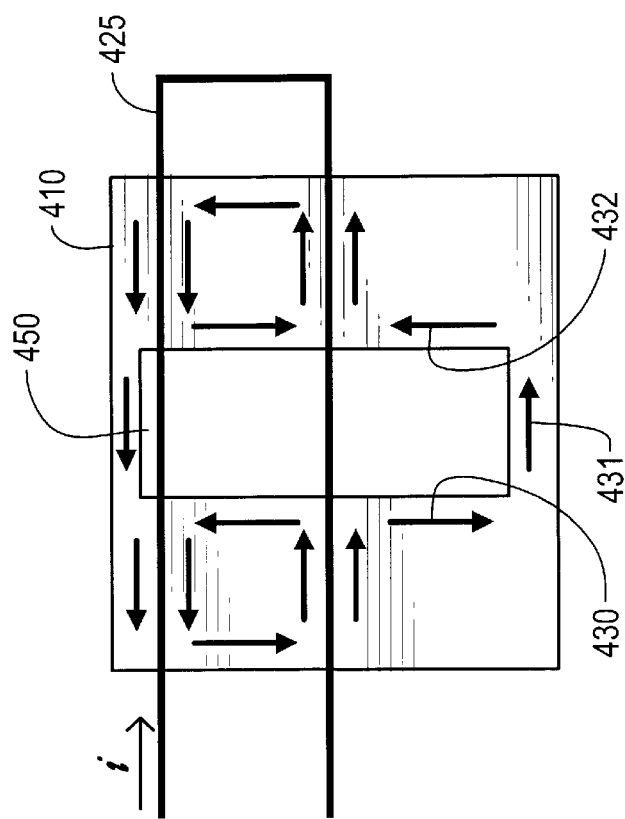
FIGS. 3 and 4 are schematic illustrations of the path of current induced in conductive sheets with and without apertures.
Figure 3:
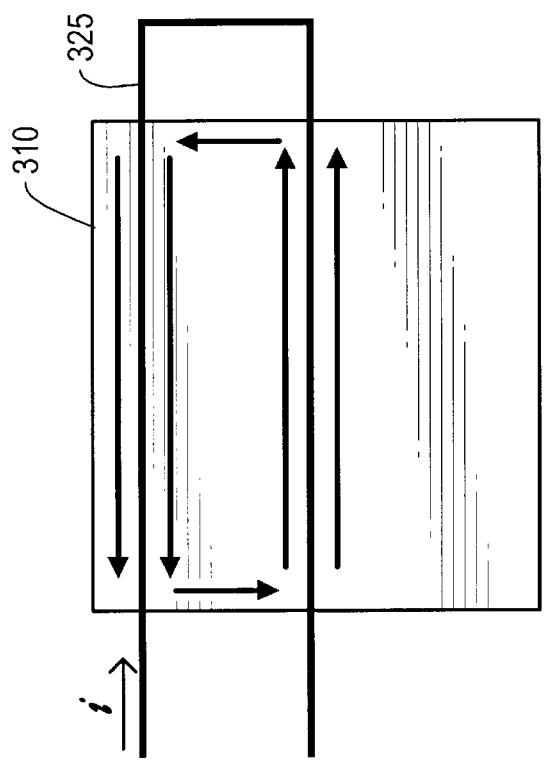

FIGS. 3 and 4 illustrate the path of the induced current in a conductive sheet. FIG. 3 illustrates a conductive sheet 310, which is held in proximity to a transmitter winding 325. A changing current i flows in a clockwise direction in the transmitter winding 325. The path of current induced in the conductive sheet 310 by the changing current i in the transmitter winding 325 is shown by the arrows in FIG. 3. The induced current flows along the surface of the conductive sheet 310 in a direction opposite to the direction that the current i flows in the transmitter winding 325. The induced current is present everywhere in the conductive sheet 310. However, the induced current is concentrated where the conductive sheet 310 is closest to the transmitter winding 325 and elsewhere as indicated by the arrows in FIG. 3.

FIG. 4 similarly illustrates the path of the induced current in a conductive sheet 410, which is held in proximity to a transmitter winding 425. A changing current i flows in a clockwise direction in the transmitter winding 425. However, the conductive sheet 410 includes an aperture 450. The aperture 450 is situated in the conductive sheet 410 so the aperture 450 controls the pattern of the flow of the induced current caused by the changing current i in the transmitter winding 425. If the aperture 450 is formed in the conductive sheet 410 as shown in FIG. 4, the induced current generated by the transmitter winding 425 will flow around the aperture 450 as shown by the arrows in FIG. 4. Due to the presence of the aperture 450, the induced current also flows in a region of the conductive sheet 410 that is not beneath the transmitter winding 425, as indicated by the arrows 430–432. This induced current flow is similar to the induced current that exists in the second loop portion of the scale loops formed from traces, described in the incorporated '387 and '813 patents. Just as scale traces can be printed or assembled to create predetermined patterns of scale loops, apertures can be created in a conductive sheet to form a tape scale. However, a tape scale with apertures can generally be constructed more economically and in longer lengths than a scale printed or assembled with scale loops.

Figure 2:
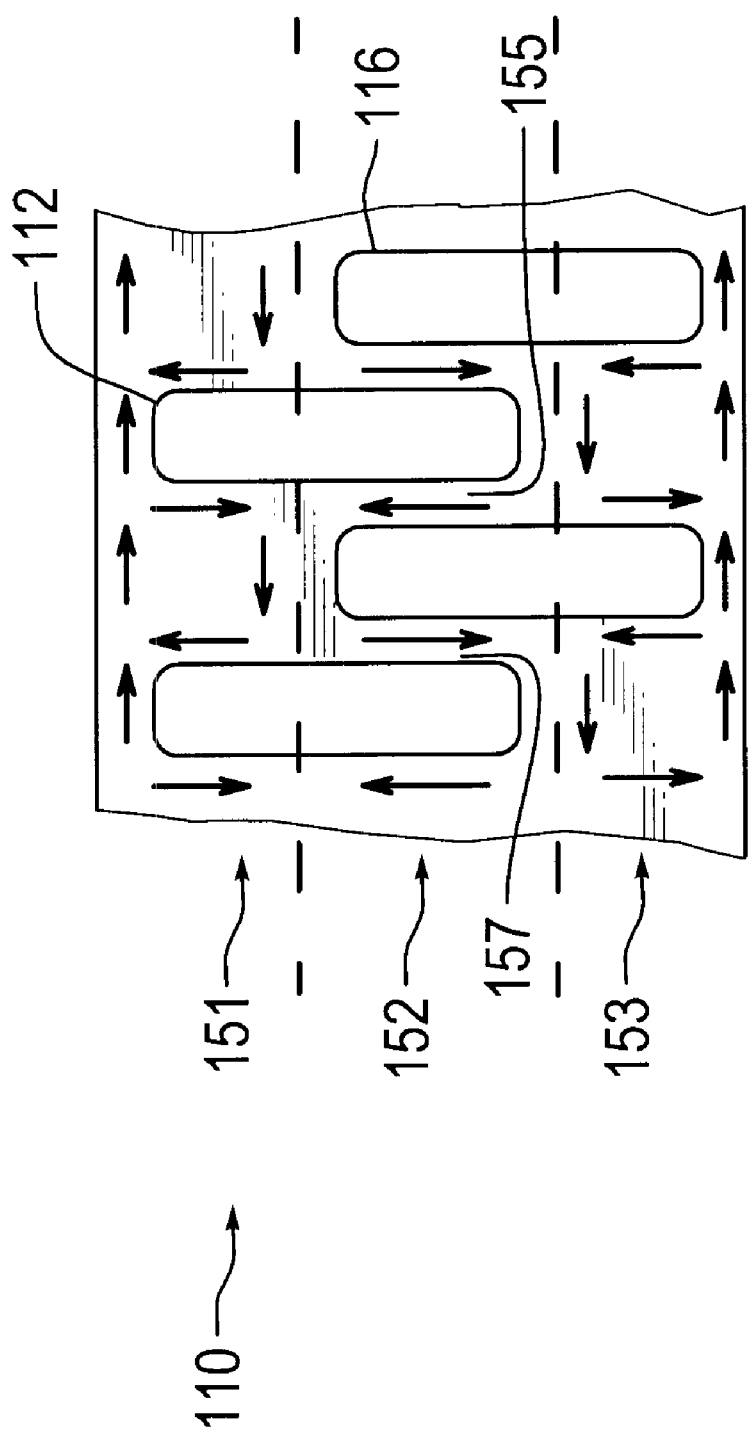
FIG. 2 is a schematic illustration of the pattern of induced current flow in the tape scale shown in FIG. 1 for a portion of the tape scale overlying the readhead of FIG. 1 during operation.

Thus, by analogy to FIG. 4, in FIGS. 1 and 2, the induced current flow pattern in the tape scale 110 adjacent to the apertures 112 and 116 is generally in a direction opposite to the direction of the current flowing in the respective adjacent portions of the transmitter loops 123A and 123B. As shown in FIG. 1, adjacent ones of the second portions 114 and 118 in the center section of the tape scale define alternating central tape scale portions 155 and 157 of the tape scale. In the exemplary embodiment shown in FIG. 1, currents will be induced in the central tape scale portions 155 and 157 having alternating polarities from one central tape scale portion 155 or 157 to the next 157 or 155. These induced currents having alternating polarities will create a secondary magnetic field having field portions of opposite polarity periodically distributed along the central region 152. The wavelength $\lambda$ of the periodic secondary magnetic field is equal to the center-to-center distance between successive central tape scale portions 155 or successive central tape scale portions 157.

The readhead 120 also includes first and second receiver windings 124 and 126. In the exemplary embodiment shown in FIG. 1, the first and second receiver windings 124 and 126 are each formed by a plurality of sinusoidally shaped loop segments 128 and 129 formed on opposite sides of an insulating layer of the printed circuit board forming the readhead 120. In various other exemplary embodiments, the loop segments may be other shapes such as triangular or trapezoidal. The loop segments 128 and 129 are linked through feed-throughs 130 to form alternating positive polarity loops 132 and negative polarity loops 134 in each of the first and second receiver windings 124 and 126. The receiver windings 124 and 126 are positioned in the center of the readhead 120 between the first and second transmitter portions 123A and 123B. Each of the first and second receiver windings 124 and 126 extends a distance $d_2$ in the direction perpendicular to the measuring axis 300. The first and second receiver windings 124 and 126 are spaced equal distances $d_3$ from the inner portions of the first and second transmitter winding portions 123A and 123B.

The loops 132 and 134 in each of the first and second receiver windings 124 and 126 have a width along the measuring axis 300 equal to $\lambda/2$. Thus, each pair of adjacent loops 132 and 134 has a width equal to $\lambda$. Thus, $\lambda$ corresponds to the sinusoidal wavelength, that is, the spatial period of the first and second receiver windings 124 and 126. Furthermore, the receiver winding 126 is offset by $\lambda/4$ from the first receiver winding 124 along the measuring axis 300. That is, the first and second receiver windings 124 and 126 are in quadrature.

The changing drive signal from the transmitter drive signal generator 150 is applied to the transmitter winding 122 such that current flows in the transmitter winding 122 from a first terminal 122A, through the transmitter winding 122 and out through a second terminal 122B. Thus, the magnetic field generated by the transmitter winding 122 rises up out of the plane of FIG. 1 inside the first transmitter winding portion 123A and descends into the plane of FIG. 1 outside the loop formed by the first transmitter winding portion 123A, and rises out of the plane of FIG. 1 outside the loop formed by the second transmitter winding portion 123B and descends into the plane of FIG. 1 inside the loop formed by the second transmitter winding portion 123B. Accordingly, the changing magnetic field within the transmitter winding 122 generates an induced electromotive force (EMF) in each of the loops 132 and 134 formed in the receiver windings 124 and 126.

The loops 132 and 134 have opposite winding directions. Thus, the EMF induced in the loops 132 has a polarity that is opposite to the polarity of the EMF induced in the loops 134. The loops 132 and 134 enclose the same size areas and thus nominally the same amount of magnetic flux. Therefore, the absolute magnitude of the EMF generated in each of the loops 132 and 134 is nominally the same.

As shown in FIG. 1, each of the first portions 113 of the first plurality of apertures 112 is arranged at a pitch equal to a wavelength $\lambda$ of the first and second receiver windings 124 and 126. In addition, the first portions 113 of the first plurality of apertures 112 extend approximately the distance di in the direction perpendicular to the measuring axis 300. Similarly, each of the first portions 117 of the second plurality of apertures 116 is also arranged at a pitch equal to the wavelength $\lambda$. The first portions 117 of the second plurality of apertures 116 also extend approximately the distance $d_1$ in the direction perpendicular to the measuring axis 300.

In the exemplary embodiment shown in FIG. 1, the second portions 114 of the first plurality of apertures 112 are arranged at a pitch equal to the wavelength $\lambda$. The second portions 118 of the second plurality of apertures 116 are also arranged at a pitch equal to the wavelength $\lambda$. The second portions 114 and 118 of the first and second pluralities of apertures 112 and 116 are interleaved along the length of the scale 110. Finally, each of the second portions 114 and 118 extends approximately the distance $d_2$ in the direction perpendicular to the measuring axis 300.

When the read head 120 is placed in proximity to the tape scale 110, as shown in FIG. 1, the first transmitter winding portion 123A aligns with the first portions 113 of the first plurality of apertures 112 along the first region 151. Similarly, the second transmitter winding portion 123B aligns with the first portions 117 of the second plurality of apertures 116 along the second region 153. Finally, the first and second receiver windings 124 and 126 align with the second portions 114 and 118 of the first and second pluralities of apertures 112 and 116 along the central region 152.

In operation, a time-varying drive signal is output by the transmitter drive signal generator 150 to the transmitter winding terminal 122A. Thus, the first transmitter winding portion 123A generates a first changing magnetic field having a first direction while the second transmitter winding portion 123B generates a second magnetic field in a second direction that is opposite to the first direction. This second magnetic field has a field strength that is equal to a field strength of the first magnetic field generated by the first transmitter winding portion 123A.

The portion of the tape scale 110 along the first region 151 overlying the first transmitter winding portion 123A is inductively coupled to the first transmitter winding portion 123A. At the same time, the portion of the tape scale 110 along the second region 153 overlying the second transmitter winding portion 123B is inductively coupled to the second transmitter winding portion 123B. In a manner analogous to the current flow described above with reference to FIG. 4, in the exemplary embodiment shown in FIG. 1, the resulting time-varying induced current in the tape scale 110 overlying the readhead 120 flows in the pattern indicated by the arrows shown in FIG. 2. The pattern of time varying induced current also creates an associated time-varying secondary (induced) magnetic field.

As previously described, the wavelength $\lambda$ of the periodic secondary magnetic field is equal to the center-to-center distance between successive central tape scale portions 155 or successive central tape scale portions 157 along the central region 152. More generally, the pattern of induced current flow in the tape scale 10, as well as the associated secondary magnetic field, have a wavelength $\lambda$ which is equal to the center-to-center distance between successive first apertures 112, or successive second apertures 116, along the measuring axis.

Accordingly, when the positive polarity loops 132 of the first receiver winding 124 are aligned with either of the central tape scale portions 155 or 157, the negative polarity loops 134 of the first receiver winding 124 are aligned with the other central tape scale portions 157 or 155, respectively. This is also true when the positive polarity loops 132 and the negative polarity loops 134 of the second receiver winding 126 are aligned with the central tape scale portions 155 or 157. Because the alternating secondary magnetic field generated along the central region 152 by the central tape scale portions 155 and 157 is spatially modulated at the same wavelength as the spatial modulation of the first and second receiver windings 124 and 126, the EMF generated in each of the positive and negative polarity loops 132 and 134 when aligned with the central tape scale portions 155 or 157 is equal and opposite to the EMF generated when the positive and negative polarity loops 132 and 134 are aligned with the other central tape scale portions 157 or 155, respectively.

It should be appreciated that in the incorporated references, the transmitter windings associated with the magnetic field generators, the receiver windings associated with the magnetic flux sensors, as well as the loops included on the scales, most frequently comprise "wire" loops enclosing well-defined areas. Thus, in the incorporated references, it was convenient and simple to understand the operation of the transducer in terms of magnetic fluxes coupled through the well-defined areas.

However, as described above and as shown with reference to FIGS. 2 and 4, the induced current patterns in the tape scales according to this invention do not present readily recognizable or well-defined loop areas. Furthermore, in various exemplary embodiments according to this invention, the receiver windings primarily overlie tape scale portions, such as the central tape scale portions 155 and 157 of FIGS. 1 and 2, which carry a significant induced current, as illustrated in FIG. 2.

Thus, in addition to considering the operation of a transducer in terms of loops and flux coupling, it is sometimes convenient to understand the operation of the transducers according to this invention in terms of mutual inductance between adjacent conductors, such as, for example, the mutual inductance between the overlying receiver windings 124 and 126 and the central tape scale portions 155 and 157. Accordingly, although the terms magnetic field generator and magnetic flux sensor have been retained herein for continuity with the incorporated references, it should be understood that the these terms are not limiting, and that the structures referred to by these terms may also be understood to operate according to the principle of mutual inductance.

Regardless of the conceptual framework used to understand the operation of the reduced-offset transducer 100, the net output of the first receiver winding 124 and the net output from the second receiver winding 126, as the readhead 120 moves relative to the tape scale 110, are each a sinusoidal function of the position "x" of the readhead 120 along the measuring axis 300 of the tape scale 110. The offset component of the output signals due to extraneous coupling is nominally zero.

Finally, the first and second receiver windings 124 and 126 are in quadrature. Thus, the output signal generated by the first receiver winding 124 as a function of x, and output to the receiver signal processing circuit 140, is 90° out of phase with the signal output by the second receiver winding 126, which is also a finction of x, output to the receiver signal processing circuit 140.

The receiver signal processing circuit 140 inputs and samples the output signals from the first and second receiver windings 124 and 126, converts these signals to digital values and outputs them to the control unit 160. The control unit 160 processes these digitized output signals to determine the relative position x between the readhead 120 and the tape scale 110 within a wavelength λ.

Based on the nature of the quadrature output from the first and second receiver windings 124 and 126, the control unit 160 is able to determine the direction of relative motion between the readhead 120 and the scale 110. The control unit 160 counts the number of partial or full "incremental" wavelengths λ traversed, by signal processing methods well-known to those skilled in the art and disclosed herein and in the incorporated references. The control unit 160 uses that number and the relative position within a wavelength λ to output the relative position between the readhead 120 and the tape scale 110 from a set origin.

The control unit 160 also outputs control signals to the transmitter drive signal generator 150 to generate the time-varying transmitter drive signal. It should be appreciated that any of the signal generating and processing circuits shown in the incorporated references can be used to implement the receiver signal processing circuit 140, the transmitter drive signal generator 150 and the control unit 160. Thus, these circuits will not be described in further detail herein.

The tape scales according to this invention are not limited to the aperture design illustrated in FIGS. 1 and 2. FIGS. 5–10 illustrate several exemplary embodiments of tape scales according to this invention having apertures of diverse shape. The tape scales shown in FIGS. 5–10, as well as any other tape scales according to this invention, can be formed in any known or later-developed manner, and of any material in which a current can be induced by known or later-developed transmitter windings for use in induced current position transducers.

For example, aperture patterns in a tape scale can be fabricated by etching a printed circuit board, directly plating or printing the conductive area of a printed circuit board, or punching, stamping, embossing, etching, machining or otherwise forming a solid conductive material such as a metallic strip, sheet, or block. Regardless of the method of fabrication, it should be appreciated that the apertures need only extend for an operable distance normal to the surface plane of the conductive material that is intended to be the primary carrier of the time-varying induced currents. That is, the apertures should be deep enough to achieve an operable patterning of the induced currents in the tape scale, so that the tape scale is usable when properly mounted in relation to an induced current readhead according to this invention.

The inventor has determined that the apertures need not extend through any underlying non-conductive substrate of a printed circuit board type tape scale, or the like. For tape scales fabricated with aperture patterns having dimensions similar to those used to obtain the results discussed below with reference to FIGS. 14–16, the inventor has determined that apertures having a depth of approximately 150 μm or more in a conductive material such as a metallic strip, sheet, or block are sufficient to provide an operable patterning of the induced currents in a tape scale according to this invention. Such tape scales provide signal strength of approximately 30–50% of the results shown in FIG. 14, and are usable for a wide range of measuring applications. For such scales, the signal strength increases to near maximum as the aperture depth is increased to approximately 500 μm. Thus, tape scale apertures need not extend all the way through tape scale conductive materials that are thicker than approximately 150 μm. Thinner materials may be punched through, etched through, or the like, and mounted such that any conductive member is positioned approximately 150 μm or more behind the operable surface of the tape scale. Thinner materials may also be stamped, embossed, or the like to displace the conductive material to a depth of approximately 150 μm or more in the area coinciding with the apertures.

FIGS. 5–7 illustrate tape scales having rectangular apertures similar in design to the tape scale illustrated in FIGS. 1 and 2. FIGS. 5–7 illustrate the rectangular aperture tape scales 1110, 1210 and 1310, respectively. The tapes scales 1110, 1210 and 1310 of FIGS. 5–7, respectively, possess all of the features of the tape scale 1110 of FIG. 5, and operate similarly. For example, the tape scale 1110 has apertures 1112 and 1116, having first and second portions 1113 and 1114, and 1117 and 1118, respectively. The tape scale 1210 has apertures 1212 and 1216, having first and second portions 1213 and 1214, and 1217 and 1218, respectively. The tape scale 1310 has apertures 1312 and 1316, having first and second portions 1313 and 1314, and 1317 and 1318, respectively.

However, each of the tape scales 1110, 1210 and 1310 differ in the width of the apertures 1112 and 1116, 1212 and 1216, and 1312 and 1316 in the direction along the measuring axis 300. As shown in FIG. 5, the width of apertures 1112 and 1116 can be nominally 0.33 λ, and the width of central tape scale portions 1155 and 1157 can be nominally 0.17 λ. As shown in FIG. 6, the width of apertures 1212 and 1216 can be nominally 0.35 λ, and the width of central tape scale portions 1255 and 1257 can be nominally 0.15 λ. As shown in FIG. 7, the width of apertures 1312 and 1316 can be nominally 0.40 λ, and the width of central tape scale portions 1355 and 1357 can be nominally 0.10 λ.

While the size of the apertures 1112 and 1116, 1212 and 1216, and 1312 and 1316 can vary, i.e., in the manner illustrated by FIGS. 5–7, it should be appreciated that the wavelength of any receiver winding employed by the induced current position transducer in which the tape scale 110, 1110, 1210 and/or 1310 is employed, should correspond to the pitch of any apertures or aperture portions overlying that receiver winding during operation.

Figure 8:
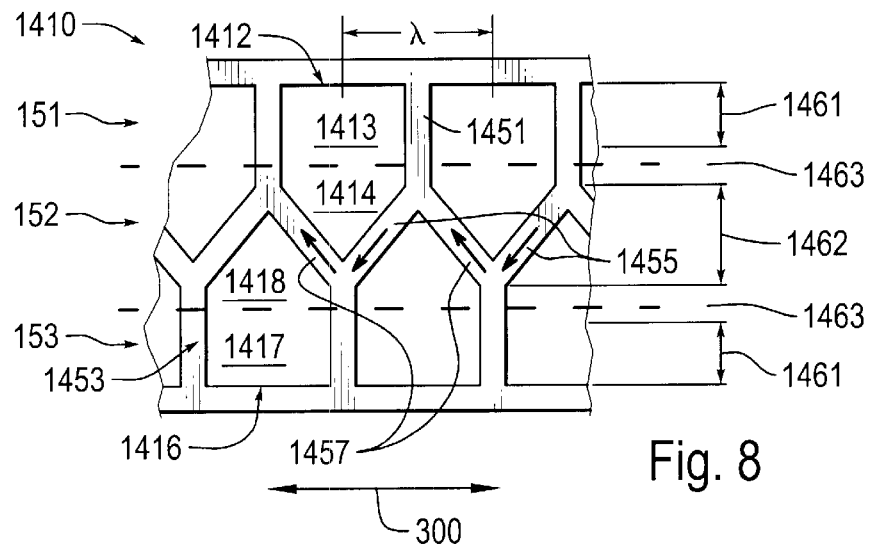
FIGS. 8–10 are plan views of three exemplary embodiments of the tape scales according to this invention having varying-width apertures.
Figure 9:
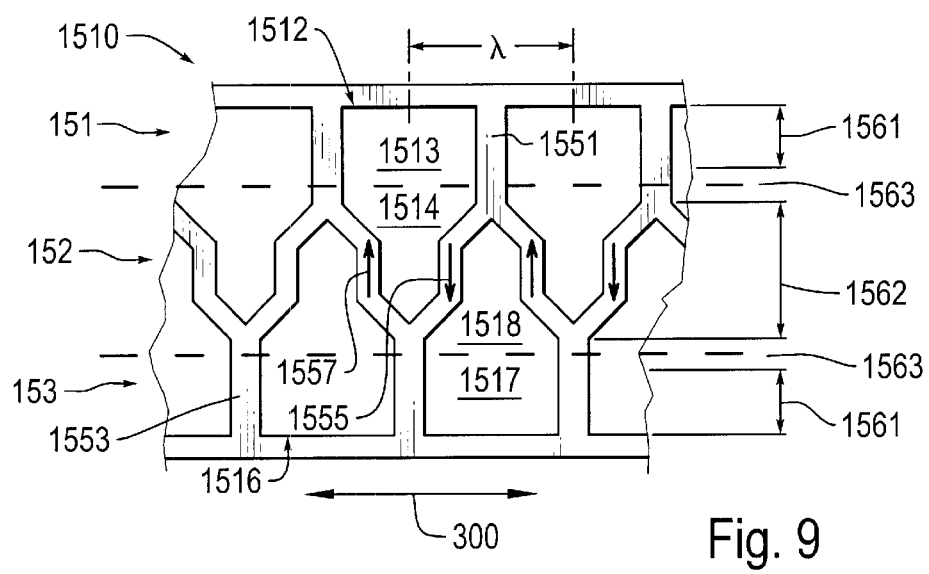
Figure 10:
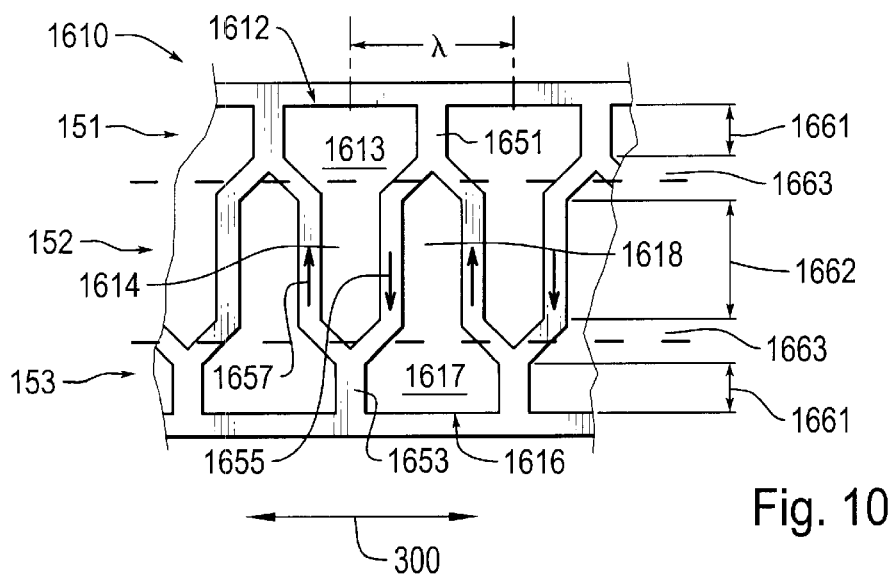

While the exemplary tape scales discussed above have been limited to those having rectangular apertures, there is no such limitation on the tape scales according to this invention. FIGS. 8–10 illustrate various exemplary embodiments of "varying-width" aperture tape scale designs usable with a reduced offset readhead, such as the readhead 120 shown in FIG. 1. As shown in FIG. 8, the tape scale 1410 includes a first plurality of apertures 1412 having a pitch λ interleaved with a second plurality of apertures 1416 having the pitch λ.

Each of the first plurality of apertures 1412 includes a first portion 1413 generally coinciding with the first region 151 and a second portion 1414 generally coinciding with the central region 152. Similarly, each of the second plurality of apertures 1416 includes a first portion 1417 generally coinciding with the second region 153 and a second portion 1418 generally coinciding with the central region 152. In the first plurality of apertures 1412, the first portions 1413 are arranged along one lateral edge of the scale 1410 and are arrayed along a measuring axis 300. The second portions 1414 are arranged along the center of the scale 1410 and are also arrayed along the measuring axis 300. Likewise, in the second plurality of apertures 1416, the first portions 1417 are arranged along a second lateral edge of the scale 1410 and arrayed along the measuring axis 300. The second portions 1418 are arranged along the center of the scale 1410 along the measuring axis 300, interleaved with the second portions 1414 of the first plurality of apertures 1412.

Tape scale portions 1451 exist between the first portions 1413 of the first plurality of apertures 1412. Tape scale portions 1453 exist between the first portions 1417 of the second plurality of apertures 1416. Central tape scale portions 1455 and 1457 exist between the second portions 1414 and 1418 of the first plurality of apertures 1412 and the second plurality of apertures 1416, respectively. The widths of tape scale portions 1451 and 1453 and the central tape scale portions 1455 and 1457, may be conveniently chosen. For example, the widths of tape scale portions 1451 and 1453 and the central tape scale portions 1455 and 1457 can be 0.2λ, 0.3λ, or the like.

It should be appreciated that, in contrast to the previously discussed tape scales having rectangular apertures, the first portions 1413 of the first plurality of apertures 1412 and the first portions 1417 of the second plurality of apertures 1416 of the tape scale 1410 have been made relatively wider in the dimension parallel to the measuring axis 300, in order to enhance the coupling to any underlying transmitter winding and increase the signal strength provided by the tape scale 1410. This is generally permissible when the transmitter windings do not include a winding configuration that is periodic along the measuring axis.

In contrast, the second portions 1414 and 1418 of the first plurality of apertures 1412 and the second plurality of apertures 1416 retain widths which allow them to be interleaved at a center-to-center spacing of one-half λ, so that the associated secondary magnetic field along the central region 152 remains periodic with a wavelength λ to match the wavelength λ of any underlying receiver winding, as previously described with reference to the various rectangular aperture tape scales.

Furthermore, it should be appreciated that, when the tape scale 1410 is operated with a readhead such as the readhead 120 of FIG. 1, the operation is analogous to that described with reference to FIG. 1. In this case, the induced current flow indicated by the arrows in the central tape scale portions 1455 and 1457 of FIG. 8 is analogous to the induced current flow previously described with reference to FIG. 2. When the tape scale 1410 is operated with a readhead such as the readhead 120 of FIG. 1, the dimensions 1461 generally coincide with dimensions $d_1$, the dimensions 1463 generally coincide with dimensions $d_3$ and the dimension 1462 generally coincides with dimension $d_2$.

Figure 14:
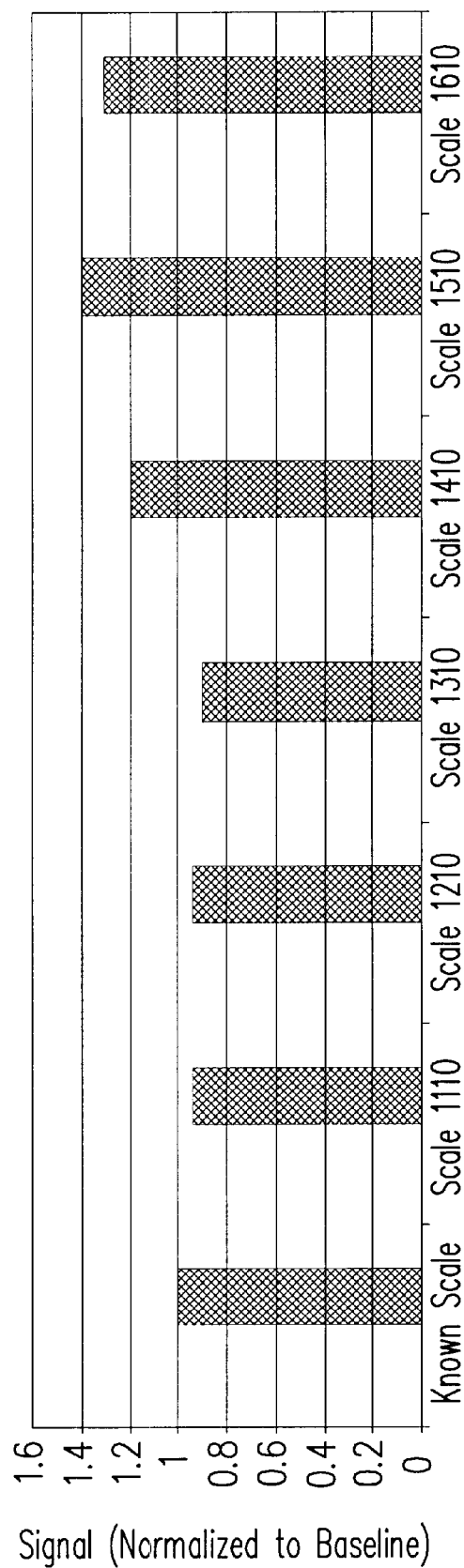
FIG. 14 is a bar graph illustrating the signal strength obtained in an induced current position transducer when the various tape scale designs of FIGS. 5–10 are employed.
Figure 15:
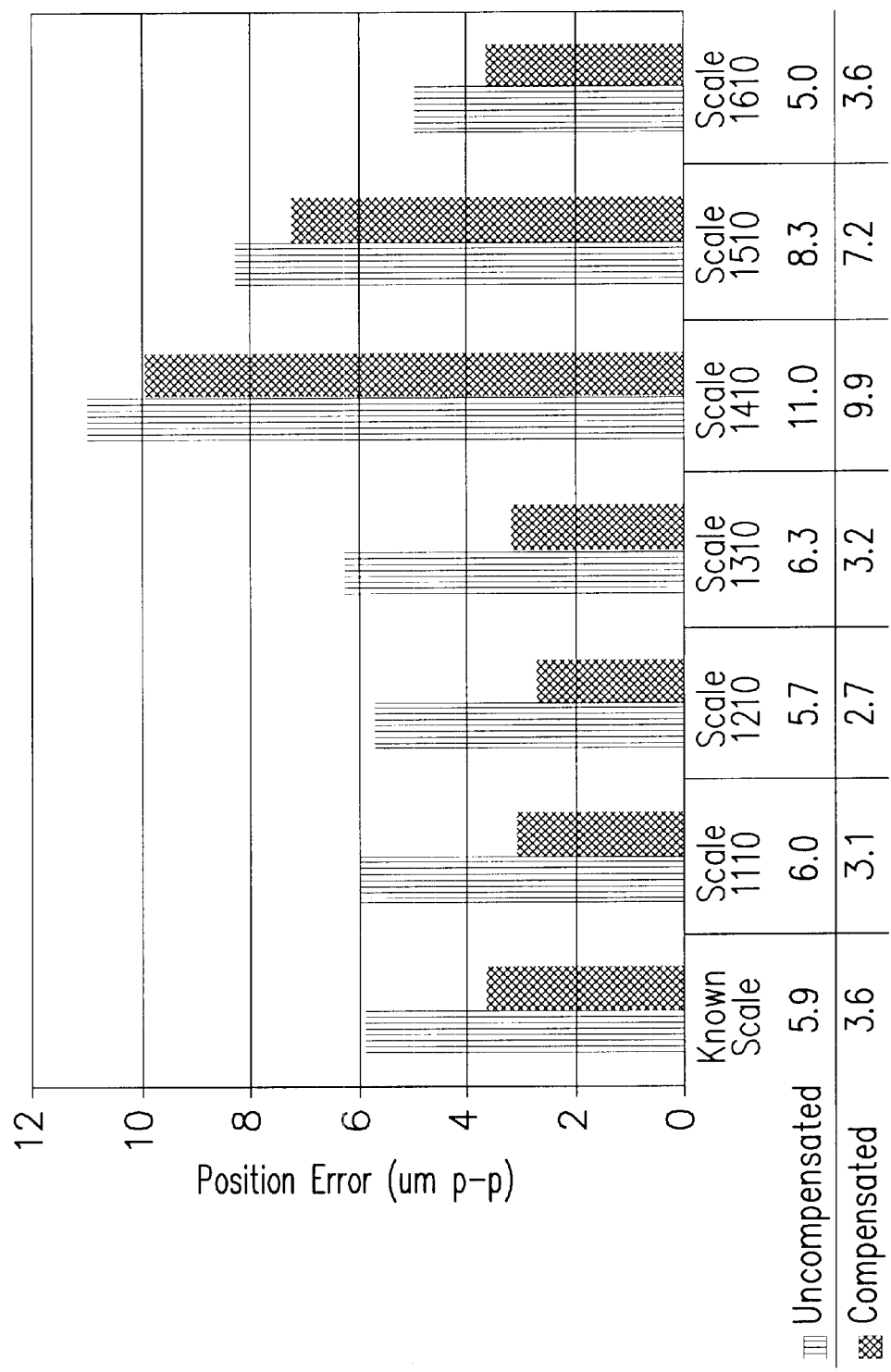
FIG. 15 is a bar graph illustrating the position error resulting in an induced current position transducer when the tape scale designs of FIGS. 5–10 are employed.
Figure 16:
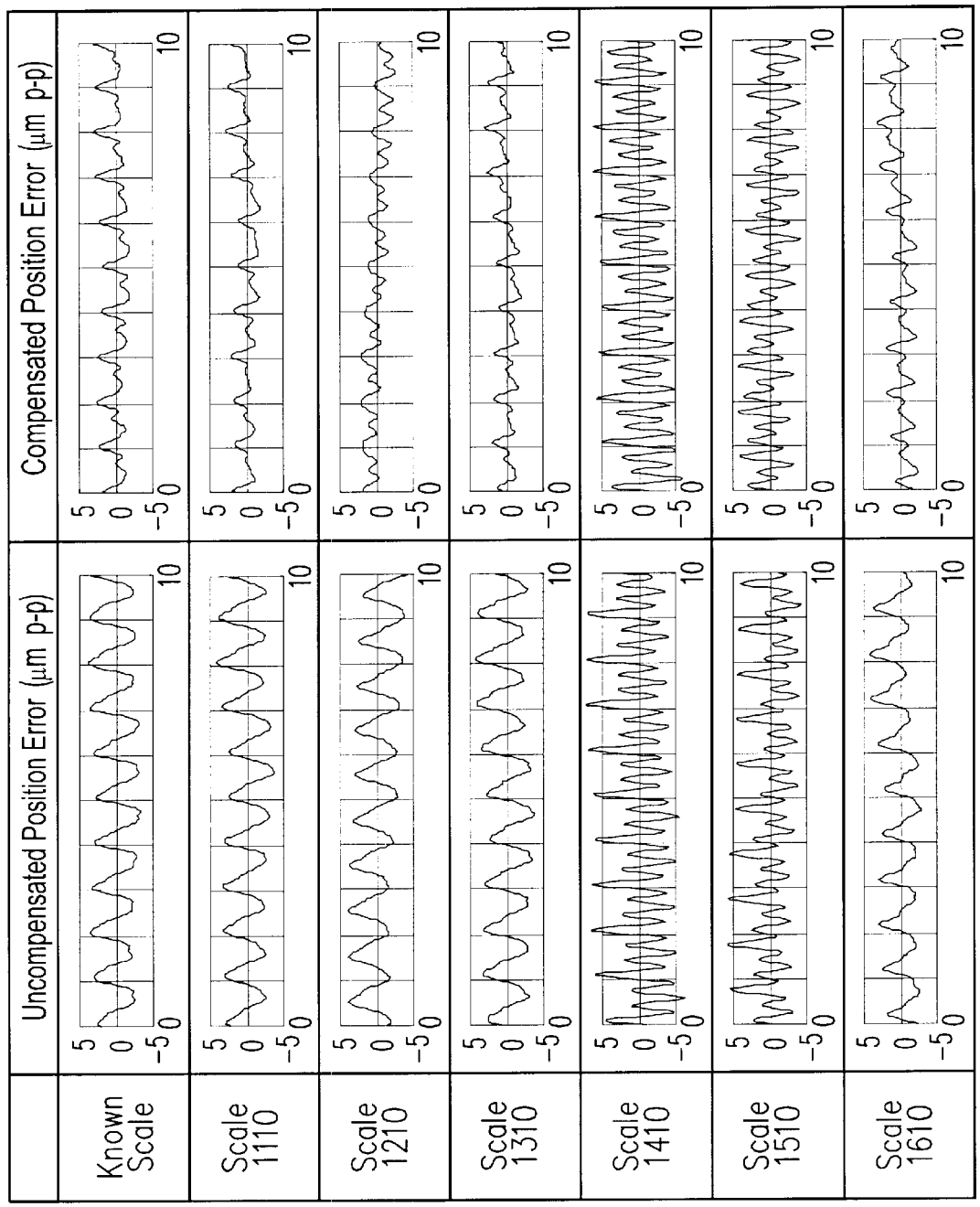
FIG. 16 is a table displaying the uncompensated and compensated error curves for an induced current position transducer employing each of the tape scale designs of FIGS. 5–10.

FIGS. 9 and 10 illustrate further exemplary varying-width tape scale designs. The tape scales 1510 and 1610 possess features that differ in size but are substantially similar to the corresponding features of the tape scale 1410 illustrated by FIG. 8, and will therefore not be described in detail. In the tape scales 1510 and 1610, the second portions 1514, 1518, 1614 and 1618 of the first and second plurality of apertures are shaped such that the central tape scale portions 1555 and 1557, and 1655 and 1657 of the tape scales approximate sinusoidal segments. As illustrated in FIGS. 14–16, and as discussed further below, such configurations offer alternatives for altering or enhancing the inductive coupling between the central tape scale portions and underlying sinusoidally-shaped receiver windings and/or for altering the harmonic content of the output signal as a function of displacement. These factors can all play a role in determining the overall errors in measurements obtained using a reduced offset induced current position transducer.

Figure 13:
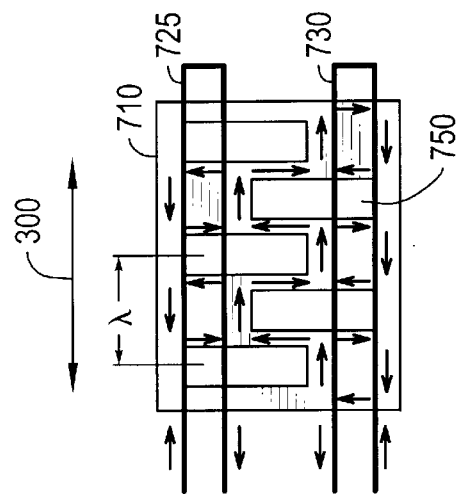
FIGS. 11–13 are schematic illustrations of the induced current pattern in exemplary tape scales according to this invention positioned relative to hypothetical transmitter winding arrangements.
Figure 12:
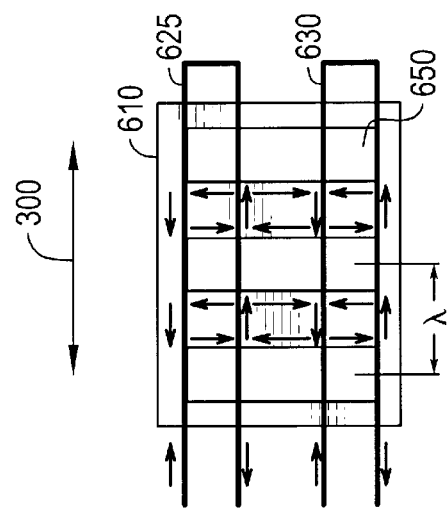
Figure 11:
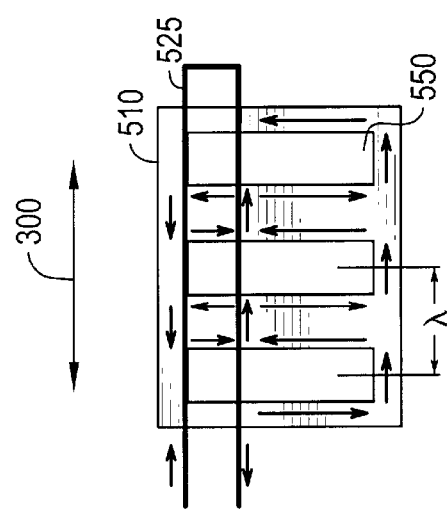

FIGS. 11–13 illustrate alternative arrangements of apertures relative to possible transmitter winding arrangements. The possible transmitter winding arrangements and related receiver winding configurations (not shown) are described in the previously incorporated references. Similarly to FIGS. 2 and 4, FIGS. 11–13 illustrate the pattern of induced current flow in segments of exemplary tape scales. In FIG. 11, a tape scale 510 is held in proximity to a transmitter winding 525, in which current is flowing in the direction indicated by the arrows along the transmitter winding 525. The tape scale 510 includes rectangular apertures 550 that are aligned along the measuring axis 300.

The single transmitter winding 525 is a loop having a major dimension parallel to the measuring axis 300. The pattern of current induced in the tape scale 510 by the transmitter winding 525 operating at high frequency is shown with arrows. There is current present everywhere in the tape scale 510 but the current is concentrated where the tape scale 510 is closest to the transmitter winding 525, and as indicated by the arrows. As previously described, the apertures 550 determine the pattern of the flow of current induced by the transmitter winding 525. The pattern is periodic, and its effects can be measured by receiver windings to ascertain position.

FIG. 12 shows a similar tape scale 610, which is held in proximity to two receiver windings 625 and 630 that separately overlap the apertures 650. In contrast to the transmitter windings connected as shown in FIG. 1, in FIG. 12, the windings are connected such that current flow in the two receiver windings 625 and 630 is not symmetrical about the midline of the scale. The pattern of the flow of current induced in the tape scale 610 is illustrated by arrows. The pattern is periodic, and its effects can be measured by receiver windings to ascertain position.

FIG. 13 illustrates the current flow through a tape scale 710 having apertures 750 that are interleaved, as in the exemplary embodiments discussed above with respect to FIGS. 1, 2 and 5–10. The portions of the apertures 750 that are not interleaved are held in proximity to two receiver windings 725 and 730 that separately overlap the apertures 750. Similarly to the transmitter windings connected as shown in FIG. 1, in FIG. 13, the windings are connected such that current flow in the two receiver windings 725 and 730 is symmetrical about the midline of the scale. However, the current shown in FIG. 13 has the opposite polarity in comparison to that described with reference to FIG. 1. The pattern of the flow of current induced in the tape scale 710 is illustrated by arrows, and is of opposite polarity in comparison to the current shown in FIG. 2. As with FIGS. 11 and 12, the pattern is periodic, and its effects can be measured by receiver windings to ascertain position.

FIG. 14 is a bar graph illustrating the signal strength obtained in an induced current position transducer when the various tape scale designs shown in FIGS. 5–10 are employed. The data reflected in FIGS. 14–16 is obtained by measuring the signal gain and position error for an induced current position transducer employing tape scales having configurations as described above with respect to FIGS. 5–10. The wavelength of the receiver windings of the readhead and the pitch, i.e., wavelength, of alternating second portions of the apertures are both 3.072 mm. The readhead is a 3-phase readhead such as described in the incorporated '387 patent. The 3-phase readhead has 3 receiver windings, and is fabricated using printed circuit board techniques.

The tape scale is made on printed circuit board material using "½ oz. copper", which provides a conductive scale strip that has a conductivity ($\sigma$) of about $5.8 \times 10^7$ $\Omega^{-1}$ $m^{-1}$ and a thickness of about 18 $\mu$m. The gap between the readhead and the scale is about 500 $\mu$m. The tape scales according to this invention are compared to a "baseline", which is a known scale of the same wavelength, but having a scale loop configuration such as described in the incorporated '387 patent, also fabricated using "½ oz. copper" on printed circuit board material.

FIG. 14 demonstrates that induced current position transducers employing tape scales according to this invention having varying-width apertures can perform with higher signal gain than a transducer employing the known scale. Induced current position transducers employing tape scales according to this invention having rectangular apertures provide slightly lower signal gain than a transducer employing the known scale. All of the tape scales according to this invention provide sufficient signal gain to be employed in practical applications.

FIG. 15 is a bar graph illustrating the maximum position error resulting when taking displacement measurements with an induced current position transducer employing the tape scale designs illustrated in FIGS. 5–10. The results are obtained from the same transducers and presented in the same order as the results shown in FIG. 14. As with the signal gain measurements in FIG. 14, the position error results observed in the induced current position transducers according to this invention are compared with the position error obtained with an induced current position transducer employing a known scale having a scale loop configuration such as described in the incorporated '387 patent. For the results indicated as "Compensated", i.e., the right-hand bar for each configuration, a small residual offset error, amplitude error and phase error, which are generally constant for a reduced-offset position transducer, are removed from the "Uncompensated" error results, i.e., the left-hand bar for each configuration.

FIG. 15 demonstrates that the tape scales according to this invention having rectangular apertures, such as described with respect to FIGS. 5–7 give position error results similar to the known scale. The tape scales having varying-width apertures described in FIGS. 8 and 9 give position error results that are greater than the known scale, but of the same order of magnitude. The varying-width tape scale of FIG. 10 gives a position error result that is comparable to or better than the error obtained with the known scale. Accordingly, employing the tape scale of FIG. 10 gives superior signal gain and comparable position error in comparison with known scales for reduced-offset inductive transducers.

FIG. 16 is a table displaying the compensated and uncompensated error curves for an induced current position transducer employing each of the tape scale designs of FIGS. 5–10. FIG. 16 shows the error data used to obtain the error results shown in FIG. 15, and thus corresponds to the transducers and results previously described with reference to FIG. 15. In FIG. 16, the x-axis represents position and is in units of the wavelength of the receiver winding. Each error curve spans 10 wavelengths. The y-axis or position error is in units of distance ($\mu$m). The error in the uncompensated error curves is mainly due to offset, except for the tapes scales having the varying-width apertures described with reference to FIGS. 8 and 9. Induced current position transducers employing these tape scales exhibit dominant third harmonic errors in the error curve.

The tape scale results shown in FIGS. 14–16 are for scales fabricated using printed circuit technology. However, the inventor has determined that the results shown in FIGS. 14–16 are substantially similar to those obtained for the same respective aperture configurations fabricated in continuous metal strips, such as brass or stainless steel strips.

Figure 17:
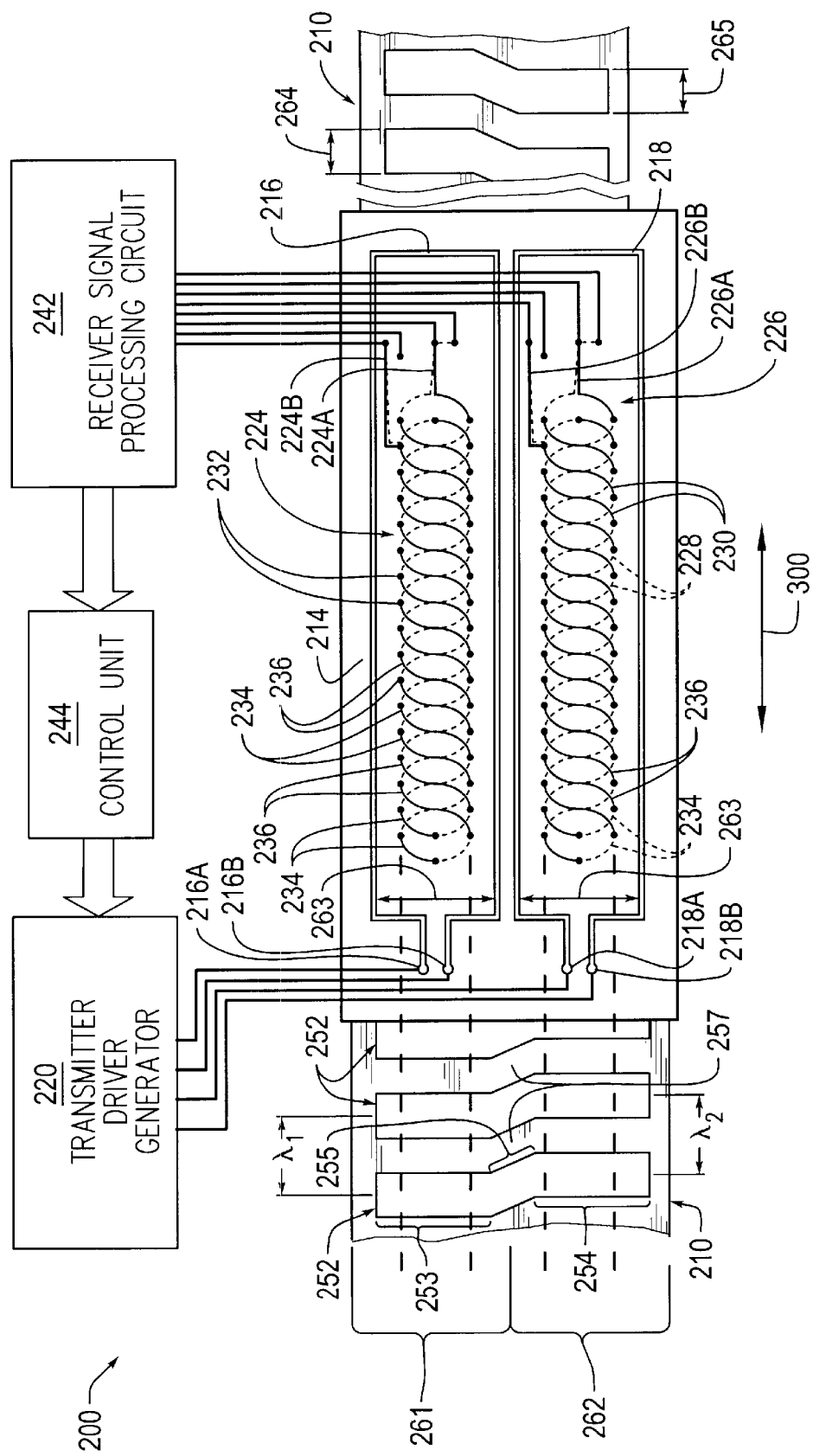
FIG. 17 is an illustration of an exemplary embodiment of an absolute reduced offset induced current position transducer according to this invention including a plan view of an exemplary embodiment of an absolute tape scale.

FIG. 17 illustrates an exemplary embodiment of an absolute reduced-offset-type induced current position transducer 200 that includes an exemplary absolute tape scale 210 having apertures 252. In contrast to the exemplary single-wavelength "incremental" reduced-offset-type induced current position transducer previously described herein and described in the incorporated '813 patent and '497 application, absolute reduced-offset-type induced current position transducers use scales incorporating a plurality of wavelengths. The plurality of wavelengths are used to produce signals exhibiting a unique relationship at each position along the inductive scale and, thus, enable determining a position "absolutely", as described in the '813 patent and '497 application.

As shown in FIG. 17, the read head 214 of the transducer 200 includes a first transmitter winding 216 and a second transmitter winding 218, each having a dimension 263 transverse to the measuring axis 300. As shown in FIG. 17, the first transmitter winding 216 is provided at a first lateral edge of the readhead 214, while the second transmitter winding 218 is provided at a second lateral edge of the read head 214. Each of the transmitter windings 216 and 218 have the same long dimension extending along the measuring axis 300, and each have a dimension 263 transverse to the measuring axis 300.

The terminals 216A and 216B of the first transmitter winding 216 and the terminals 218A and 218B of the second transmitter winding 218 are connected to the transmitter drive signal generator 220. The transmitter drive signal generator 220 selectively outputs a time-varying drive signal to either the first transmitter winding 216 or the second transmitter winding 218. Thus, a time-varying current flows through either the first transmitter winding 216 or the second transmitter winding 218. As shown in FIG. 17, in response to the transmitter drive signal generator 220 applying a time-varying drive signal causing a clockwise current to flow at a first instant in time in the first transmitter winding 216, the first transmitter winding 216 generates a primary magnetic field that descends into the plane of FIG. 17 inside the first transmitter winding 216 and rises up out of the plane of FIG. 17 outside the loop formed by the first transmitter winding 216.

In response to the time varying current and the associated primary magnetic fields, a first pattern of time varying induced current flow is induced in the tape scale 210 and produces an associated changing magnetic field. The pattern of the current flow is determined by the plurality of apertures 252, the current flowing so as to counteract the changing primary magnetic fields. The first pattern of time varying induced current and the associated changing magnetic field is sensed by a second receiver winding group 226 including the first and second receiver windings 226A and 226B, described further below.

Similarly, in response to the drive signal generator 220 applying a time-varying drive signal causing a clockwise current to flow at a second instant in time in the second transmitter winding 218, the second transmitter winding 218 generates a primary magnetic field that descends into the plane of FIG. 17 inside the second transmitter winding 218 and rises up out of the plane of FIG. 17 outside the loop formed by the second transmitter winding 218. In response to the time varying current and the associated primary magnetic fields, a second pattern of time varying induced current flow is induced in the tape scale 210 and produces an associated changing magnetic field. The pattern of the current flow is determined by the plurality of apertures 252, the current flowing so as to counteract the changing primary magnetic fields. The second pattern of time varying induced current and the associated changing magnetic field is sensed by a first receiver winding group 224 including the first and second receiver windings 224A and 224B, described further below.

Each of the first plurality of apertures 252 of the exemplary tape scale 210 shown in FIG. 17 includes a first portion 253 and a second portion 254. The first portions 253 are arrayed along a first lateral edge of the scale 210 and are aligned with a region 261 that coincides with the first transmitter winding 216 and the first receiver winding group 224. The first portions 253 have a dimension transverse to the measuring axis 300 that is approximately the same as, and aligned with, the dimension 263 of the first transmitter winding. The second portions 254 are arrayed along a second lateral edge of the scale 210 and are aligned with a region 262 that coincides with the second transmitter winding 218 and the second receiver winding group 226. The second portions have a dimension transverse to the measuring axis 300 that is approximately the same as, and aligned with, the dimension 263 of the second transmitter winding 218. The first portion 253 of the aperture 252 is connected to the second portion 254 by a central portion 255, as shown in FIG. 17. The tape scale portions 257 lie between the apertures 252.

The readhead 214 includes first and second receiver winding groups 224 and 226. The first receiver winding group 224 includes first and second receiver windings 224A and 224B, each having an associated wavelength $\lambda_1$. The second receiver winding group includes first and second receiver windings 226A and 226B, each having an associated wavelength $\lambda_2$. Otherwise, each of the receiver winding groups 224 and 226 are constructed as previously described with reference to the receiver windings 124 and 126 of FIG. 1, and operate substantially similarly to the receiver windings 124 and 126 at the first and second instants of time, respectively. Therefore, the receiver winding groups 224 and 226 will not be described in further detail here.

In the exemplary absolute tape scale 210, according to the previously described principles, each of the first portions 253 are arranged in the direction along the measuring axis 300 at a center-to-center spacing equal to the wavelength $\lambda_1$ of the underlying first receiver winding group 224. Thus, the pattern of induced current flow in the tape scale 210, as well as the associated secondary magnetic field, have a wavelength $\lambda_1$ in the region 261 at the second instant in time, as appropriate for sensing by the first receiver winding group 224. Each first portion 253 has a dimension 264 along the measuring axis 300 of approximately one-half the wavelength $\lambda_1$. In various exemplary embodiments, the dimension 264 is selected based on test results such as those shown in FIGS. 14–16, to provide the best accuracy.

According to the same principles, each of the second portions 254 is arranged in the direction along the measuring axis 300 at a center-to-center spacing equal to the wavelength $\lambda_2$ of the underlying second receiver winding group 226. Thus, the pattern of induced current flow in the tape scale 210, as well as the associated secondary magnetic field, have a wavelength $\lambda_2$ in the region 262 at the first instant in time, as appropriate for sensing by the second receiver winding group 226. Each second portion 254 has a dimension 265 along the measuring axis of approximately one-half the wavelength $\lambda_2$. In various exemplary embodiments, the dimension 265 is selected based on test results such as those shown in FIGS. 14–16, to provide the best accuracy.

Figure 18:
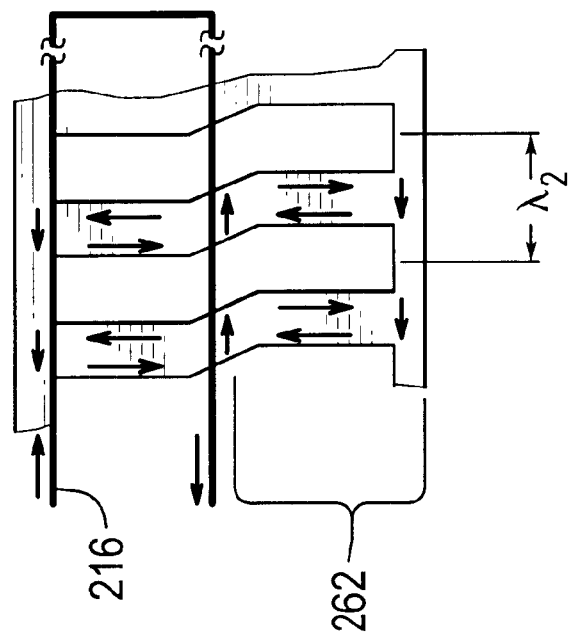

FIG. 18 shows the induced current flow pattern in a segment of the tape scale 210 when the first transmitter winding 216 is driven during the previously discussed first instant of time. In a manner analogous to the current flow described above with reference to FIG. 11, in the exemplary embodiment shown in FIG. 17, during the first instant of time, the resulting time-varying induced currents in the segment of the tape scale 210 overlying the readhead 214 flow in the pattern indicated by the arrows shown in FIG. 18. The pattern of induced current flow in the tape scale 210, as well as the associated secondary magnetic field, changes polarity periodically at approximately one-half the wavelength $\lambda_2$ in the region 262, as appropriate for sensing by the second receiver winding group 226.

Figure 19:
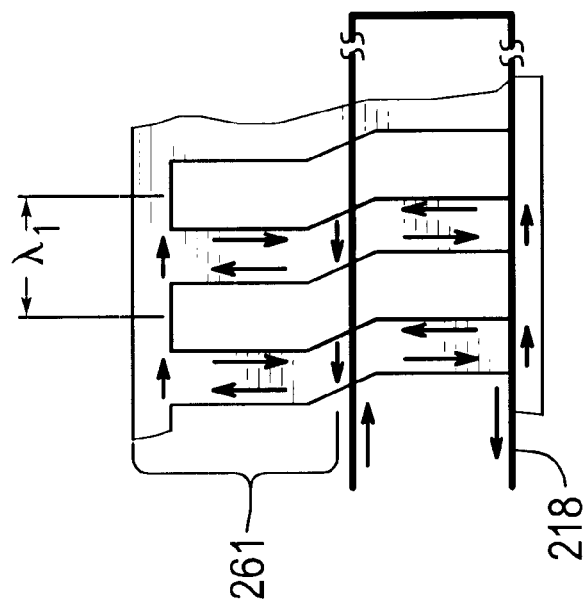
FIGS. 18 and 19 are schematic illustrations of the patterns of induced current flow in the absolute tape scale shown in FIG. 17 for a portion of the tape scale overlying the readhead of FIG. 17 during operation at different times.

FIG. 19 shows the induced current flow pattern in a segment of the tape scale 210 when the second transmitter winding 218 is driven during the previously discussed second instant of time. In a manner analogous to the current flow described above in reference to FIG. 18, in the exemplary embodiment of FIG. 17 during the second instant of time the resulting time-varying induced currents in the segment of the tape scale 210 overlying the readhead 214 flow in the pattern indicated by the arrows shown in FIG. 19. The pattern of induced current flow in the tape scale 210, as well as the associated secondary magnetic field, change polarity periodically at approximately one-half the wavelength $\lambda_1$ in the region 261, as appropriate for sensing by the first receiver winding group 224.

At the first and second instants of time respectively, the exemplary absolute tape scale 210 and the exemplary absolute reduced-offset-type induced current position transducer 200 shown in FIG. 17 operate substantially similarly to the exemplary reduced-offset-type induced current position transducer 100 shown in FIG. 1. Thus, the construction and operation of the absolute reduced-offset-type induced current position transducer 200 will not be described in further detail here. Additional details of the construction and operation of the absolute reduced-offset-type induced current read head 214 and position transducer 200, including the operation of the control unit 244 and the receiver signal processor 242 in order to provide absolute measurement, are described and taught in detail in the incorporated '813 patent and '497 application.

It should be appreciated that, although the foregoing embodiments are shown as linear transducers, the designs are readily converted to cylindrical and circular rotary applications, according to the applicable teachings of the incorporated '389 patent. In such cases, apertures are to be included along a track in a conductive sheet shaped as a circular disk or a cylinder, the track being substantially electrically equivalent to the tape scales described and illustrated herein. Furthermore, although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. One such appropriate signal processing technique is disclosed in reference to FIG. 21 of the incorporated '389 patent. Other applicable signal processing techniques will be apparent to those skilled in the art.

While this invention has been described in conjunction with the specific embodiments above, it is evident that many alternatives, combinations, modifications, and variations are apparent to those skilled in the art. Accordingly, the preferred embodiments of this invention, as set forth above are intended to be illustrative, and not limiting. Various changes can be made without departing from the spirit and scope of this invention.

What is claimed is:

1. An inductive position sensor, comprising:
   a first member;
   a second member having a measuring axis, the first member movable relative to the second member along the measuring axis;
   at least one magnetic field generator positioned on one of the first and second members, each magnetic field generator generating a first changing magnetic flux in a respective first region in response to a drive signal;
   the other of the first and second members comprising at least one conductive track including a plurality of apertures formed in the conductive track, a first portion of each aperture positionable within a respective first region and a second portion of each aperture positionable in a respective second region distinct from the respective first region, and an induced current flow generated in the conductive track in response to at least one of the first changing magnetic flux and the drive signal, the induced current flow including induced current flow in the respective second region; and
   at least one magnetic flux sensor positioned on the one of the first and second members;
   wherein:
      at least one of a) the at least one magnetic flux sensor, and b) the at least one magnetic field generator includes a wire-like conductor extending along the measuring axis, the placement of the wire-like conductor being spatially modulated along the measuring axis in a direction transverse to the measuring axis so that the direction of the conductor is alternatingly in a first direction transverse to the measuring axis and a second direction, which is opposite to the first direction, transverse to the measuring axis,
      each magnetic flux sensor is positioned outside the respective first region to sense at least one of the induced current flow and a second changing magnetic flux in the respective second region , and
      each magnetic flux sensor generates an output signal which is a function of the relative position between the magnetic flux sensor and at least some of the plurality of apertures based on the sensed at least one of the induced current flow and the second changing magnetic flux in the respective second region.

2. The inductive position sensor of claim 1, wherein the second portions of the apertures are arranged periodically at a first wavelength parallel to the measuring axis.

3. The inductive position sensor of claim 1, wherein the conductive track comprises one of a conductive track on printed circuit board material, a conductive track in a metal sheet, a conductive track in metal block and a conductive track in metal strip.

4. The inductive position sensor of claim 1, wherein the wire-like conductor forms a boundary of a pattern of alternating polarity regions.

5. The inductive position sensor of claim 4, wherein the pattern of alternating polarity regions comprises regions arranged on a surface, the regions arranged along a direction extending parallel to the measuring axis.

6. The inductive position sensor of claim 1, wherein the one of a) the at least one magnetic field generator and b) the at least one magnetic flux sensor is positioned on the first member or the second member, and the plurality of apertures are formed in the other one of the first member and the second member.

7. The inductive position sensor of claim 6, wherein the at least one magnetic field generator and the at least one magnetic flux sensor are positioned on one of the first member and the second member.

8. The inductive position sensor of claim 1, wherein at least one of the first and second members are printed circuit boards, and at least one of the magnetic field generator and magnetic flux sensor are fabricated by printed circuit board processing.

9. The inductive position sensor of claim 1, further comprising:
   an energy supply source that outputs a power supply;
   a drive circuit that inputs the power supply and outputs a drive signal to at least one of the at least one magnetic field generator during each measurement cycle; and
   an analyzing circuit that inputs the output signal from the at least one magnetic flux sensor, determines a position of the first member relative to the second member, and outputs a position signal indicative of the position of the first member relative to the second member at a first level of resolution.

10. The inductive position sensor of claim 1, wherein the placement of the wire-like conductor is spatially modulated at a wavelength.

11. The inductive position sensor of claim 10, wherein the plurality of apertures includes a first plurality of apertures arranged along the measuring axis at a pitch equal to the wavelength.

12. The inductive position sensor of claim 11, wherein the plurality of apertures further includes a second plurality of apertures arranged along the measuring axis offset by one-half of the wavelength from the first plurality of apertures and at a pitch equal to the wavelength, and the first plurality of apertures and the second plurality of apertures alternate along the measuring axis in at least a region adjacent to the wire-like conductor spatially modulated along the measuring axis.

13. The inductive position sensor of claim 1, wherein the first portions of the plurality of apertures have widths parallel to the measuring axis that are different than the widths of the second portions of the plurality of apertures parallel to the measuring axis.

14. The inductive position sensor of claim 1, wherein the measuring axis is linear.

15. The inductive position sensor of claim 1, wherein the measuring axis is circular.

16. An inductive position sensor comprising:
a reduced-offset inductive readhead; and
a tape scale comprising at least one conductive track including a plurality of apertures formed in the conductive track, the plurality of apertures arranged along a desired measuring axis;
wherein:
a first portion of each aperture is positionable within a respective first region corresponding to a respective magnetic field generator of the reduced-offset inductive readhead; and
a second portion of each aperture is positionable in a respective second region corresponding to a respective magnetic flux sensor of the reduced-offset inductive readhead that is distinct from the respective first region;
the reduced-offset inductive readhead and tape scale are operable to induce a time-varying current flow in the conductive track in response to the operation of the respective magnetic field generator, the induced current flow including induced current flow in the respective second region; and
the reduced-offset inductive readhead is further operable to sense at least one of the induced current flow and a changing magnetic flux in the respective second region with the respective magnetic flux sensor.

17. The inductive position sensor of claim 16, wherein the reduced-offset inductive readhead is further operable to determine a position of the reduced-offset inductive readhead relative to the tape scale along the desired measuring axis based at least partly on an output of the respective magnetic flux sensor, the output based on the sensed at least one of the induced current flow and a changing magnetic flux in the respective second region.

18. The inductive position sensor of claim 16, wherein the second portions of the apertures are arranged periodically at a first wavelength parallel to the measuring axis.

19. The inductive position sensor of claim 18, wherein each second portion of the apertures has a width parallel to the measuring axis that is approximately equal to or less than one-half the first wavelength, and the first portions of such apertures have widths parallel to the measuring axis that are equal to or greater than the widths of the second portions.

20. The inductive position sensor of claim 16, wherein the conductive track comprises one of a conductive track on a printed circuit board material, a conductive track in a conductive sheet material, a conductive track in a conductive block material and a conductive track in a conductive strip material.

21. The inductive position sensor of claim 20, wherein any conductive material coinciding with the area of any operable aperture is located approximately 150 µm or more behind a surface of the tape scale in a direction normal to the surface and away from the reduced-offset inductive readhead.

22. The inductive position sensor of claim 20, wherein at least one operable aperture does not extend all the way through the conductive material which includes the conductive track.

23. The inductive position sensor of claim 16, wherein the conductive track comprises one of a linear track, an arc in a plane, a circle in a plane, an arc around a cylinder and a circle around a cylinder.

24. An inductive position sensor comprising:
an absolute reduced-offset inductive readhead; and
a tape scale comprising at least one conductive track including a plurality of apertures formed in the conductive track, the plurality of apertures arranged along a desired measuring axis;
wherein,
a first portion of each aperture is positionable within a respective first region corresponding to a respective first magnetic field generator and a first magnetic flux sensor of the reduced-offset inductive readhead, the first portions arranged periodically at a first wavelength parallel to the measuring axis; and
a second portion of each aperture is positionable in a respective second region corresponding to a respective second magnetic flux sensor and a respective second magnetic field generator of the reduced-offset inductive readhead, the respective second region distinct from the respective first region, the second portions arranged periodically at a second wavelength parallel to the measuring axis; and
the absolute reduced-offset inductive readhead and tape scale are operable to induce a time-varying current flow in the conductive track in response to the operation of the respective first magnetic field generator during a first time period, the induced current flow including induced current flow in the respective second region wherein the respective second magnetic flux sensor senses at least one of the induced current flow and a changing magnetic flux in the respective second region during the first time period; and
the absolute reduced-offset inductive readhead and tape scale are operable to induce a time-varying current flow in the conductive track in response to the operation of the respective second magnetic field generator during a second time period, the induced current flow including induced current flow in the respective first region wherein the respective first magnetic flux sensor senses at least one of the induced current flow and a changing magnetic flux in the respective first region during the second time period.

25. The inductive position sensor of claim 24, wherein the absolute reduced-offset inductive readhead is further operable to make an absolute position determination of the absolute reduced-offset inductive readhead relative to the tape scale along the desired measuring axis, the absolute position determination based at least partly on an output of the respective first magnetic flux sensor and an output of the respective second magnetic flux sensor, each output based on the sensed at least one of the induced current flow and a changing magnetic flux during the respective time periods.

* * * * *